(12) United States Patent
Lee et al.

(10) Patent No.: US 6,853,406 B2
(45) Date of Patent: Feb. 8, 2005

(54) IN-PLANE SWITCHING LCD DEVICE

(75) Inventors: Joun-Ho Lee, Taegu (KR); Doo-Hyun Ko, Kyoungsangbuk-do (KR)

(73) Assignee: LG.Philips LCD. Co., Ltd., Seoul (KR)

( * ) Notice: Subject to any disclaimer, the term of this patent is extended or adjusted under 35 U.S.C. 154(b) by 357 days.

(21) Appl. No.: 09/910,058

(22) Filed: Jul. 23, 2001

(65) Prior Publication Data

US 2002/0018156 A1 Feb. 14, 2002

(30) Foreign Application Priority Data

Jul. 24, 2000 (KR) ........................................ 2000-42533

(51) Int. Cl.⁷ .............................................. G02F 1/136
(52) U.S. Cl. .............................. 349/43; 349/42; 349/46; 349/141
(58) Field of Search .............................. 349/42, 43, 44, 349/46, 141; 257/59, 72; 342/42, 43, 44

(56) References Cited

U.S. PATENT DOCUMENTS 5,598,285 A    1/1997  Kondo et al. .................. 349/39
6,587,160 B2 *  7/2003  Lee et al. ...................... 349/40

FOREIGN PATENT DOCUMENTS

JP      2000-147539    5/2000
JP      2000-155343    6/2000

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95; pp. 577–580.
M. Ohta et al.; "Development of Super–TFT–LCDs with In–Plane Switching Display Mode"; Asia Display '95; pp. 707–710.
S. Matsumoto et al.; Display Characteristics of In–Plane Switching (IPS) LCDs and a Wide–Viewing–Angle 14.5–in. OPS TFT–LCD; Euro Display '96; pp. 445–448.
H. Wakemoto et al.; "An Advanced In–Plane Switching Mode TFT–LCD"; SID 97 Digest; pp. 929–932.
S.H. Lee et al.; High–Transmittance, Wide–Viewing–Angle Nematic Liquid Crystal Display Controlled by Fringe–Field Switching; Asia Display '98; pp. 371–374.

* cited by examiner

Primary Examiner—Tom Thomas
Assistant Examiner—Matthew C Landau
(74) Attorney, Agent, or Firm—McKenna Long & Aldridge LLP (57) ABSTRACT

The present invention concerns a liquid crystal display device including: a substrate; a plurality of thin film transistors each including a gate electrode, a source electrode, and a drain electrode; a gate line and a data line electrically connecting with the gate electrode and the source electrode, respectively; and a pixel electrode electrically connecting with the drain electrode, wherein overlapping widths between the gate electrode and the source and drain electrodes vary in accordance with the position of the thin film transistor.

3 Claims, 6 Drawing Sheets

IN-PLANE SWITCHING LCD DEVICE

This application claims the benefit of Korean Patent Applications No. 2000-42533 filed on Jul. 24, 2000, which is hereby incorporated by reference as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

A typical liquid crystal display (LCD) device uses optical anisotropy and polarization properties of liquid crystal molecules. The liquid crystal molecules have a definite orientational order in alignment resulting from their thin and long shapes. The alignment of the liquid crystal molecules can be controlled by supplying an electric field to the liquid crystal molecules. In other words, as the alignment direction of the electric field is changed, the alignment of the liquid crystal molecules also changes. Because incident light is refracted to the orientation of the liquid crystal molecules due to the optical anisotropy of the aligned liquid crystal molecules, image data is displayed.

Liquid crystal is classified into positive liquid crystal and negative liquid crystal, depending on the electrical properties of the liquid crystal. The positive liquid crystal has a positive dielectric anisotropy such that long axes of liquid crystal molecules are aligned parallel to an electric field. Whereas, the negative liquid crystal has a negative dielectric anisotropy such that long axes of liquid crystal molecules are aligned perpendicular to an electric field.

By now, active matrix LCDs, in which the thin film transistors and the pixel electrodes are arranged in the form of a matrix, are widely used because of their high resolution and superiority in displaying moving video data.

Figure 1:
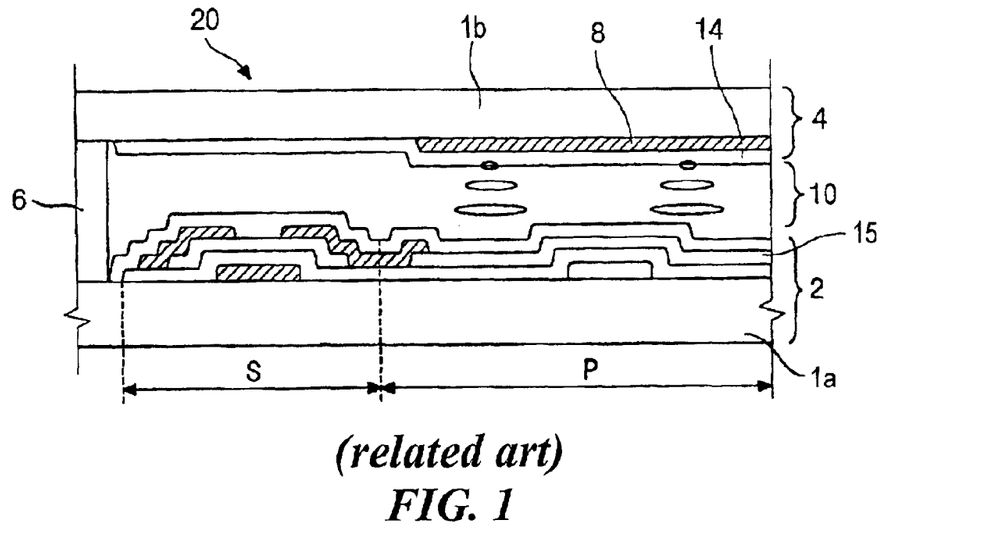
FIG. 1 is a cross-sectional view illustrating a typical liquid crystal display device.

FIG. 1 is a cross-sectional view illustrating a typical twisted nematic (TN) LCD panel. As shown in FIG. 1, the TN LCD panel has lower and upper substrates 2 and 4 and an interposed liquid crystal layer 10. The lower substrate 2 includes a first transparent substrate 1a and a thin film transistor ("TFT") "S". The TFT "S" is used as a switching element to change orientation of the liquid crystal molecules. The lower substrate 2 further includes a pixel electrode 15 that applies an electric field to the liquid crystal layer in accordance with signals applied by the TFT "S". The upper substrate 4 has a second transparent substrate 1b, a color filter 8 on the second transparent substrate 1b, and a common electrode 14 on the color filter 8. The color filter 8 implements color for the LCD panel. The common electrode 14 serves as another electrode for applying a voltage to the liquid crystal layer 10. The pixel electrode 15 is arranged over a pixel region "P," i.e., a display area. A transparent conductive material like indium tin oxide (ITO) having superior light transmittance is used for the pixel electrode 15. Further, to prevent leakage of the liquid crystal layer 10 between the lower and upper substrates 2 and 4, those substrates are sealed by a sealant 6.

As described above, because the pixel and common electrodes 15 and 14 of the conventional TN LCD panel are positioned on the lower and upper substrates 2 and 4, respectively, the electric field induced therebetween is perpendicular to the lower and upper substrates 2 and 4. The above-mentioned liquid crystal display device has advantages of high transmittance and aperture ratio, and further, since the common electrode on the upper substrate serves as an electrical ground, the liquid crystal is protected from a static electricity.

However, the above-mentioned operation mode of the TN LCD panel has a disadvantage of a narrow viewing angle. To overcome the above-mentioned problem, an in-plane switching (IPS) LCD panel was developed. The IPS LCD panel implements a parallel electric field that is parallel to the substrates, which is different from the TN or STN (super twisted nematic) LCD panel. A detailed explanation about operation modes of a typical IPS LCD panel will be provided with reference to FIGS. 2, 3A, 3B, 4A and 4B.

Figure 2:
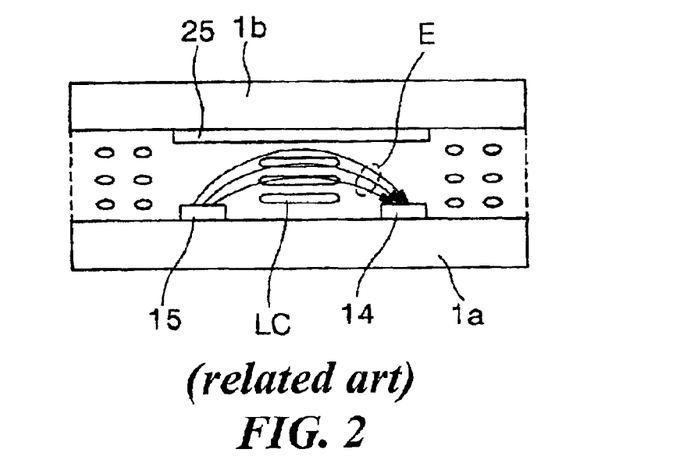
FIG. 2 is a cross-sectional view illustrating a typical IPS LCD device.

As shown in FIG. 2, first and second substrates 1a and 1b are spaced apart from each other, and a liquid crystal "LC" is interposed therebetween. The first and second substrates 1a and 1b are called an array substrate and a color filter substrate, respectively. Pixel and common electrodes 15 and 14 are disposed on the first substrate 1a. The pixel and common electrodes 15 and 14 are parallel with and spaced apart from each other. On a surface of the second substrate 1b, a color filter 25 is disposed opposing the first substrate 1a. The pixel and common electrodes 15 and 14 apply an electric field "E" to the liquid crystal "LC", then it is aligned parallel to the electric field "E".

Figure 3A:
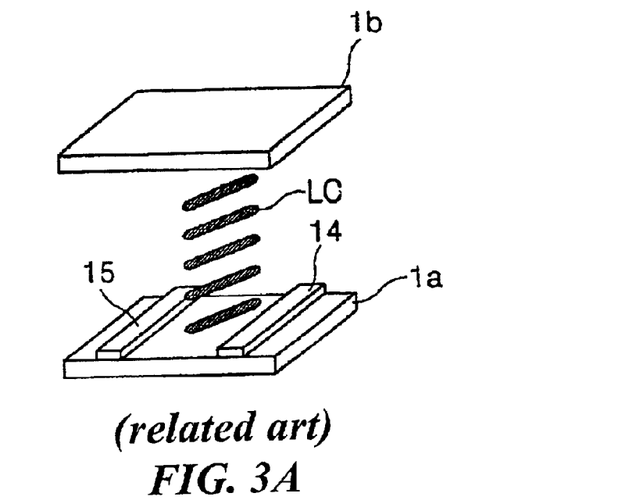
FIGS. 3A and 4A are perspective views illustrating operation modes of the typical IPS LCD device of FIG. 2.
Figure 3B:
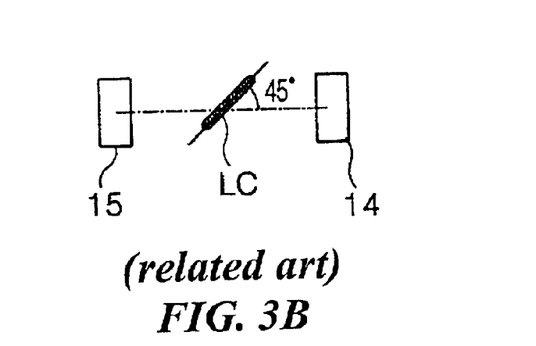
FIGS. 3B and 4B are plan views illustrating the operation modes of the typical IPS LCD device of FIGS. 3A and 4A, respectively.

FIGS. 3A and 3B conceptually illustrate "off state" operation modes for a typical IPS LCD device. In an off state, the long axes of the LC molecules "LC" maintain a definite angle with respect to a line that is perpendicular to the pixel and common electrodes 15 and 14. The pixel and common electrode 15 and 14 are parallel with each other. Herein, the angle difference is 45 degrees, for example.

Figure 4A:
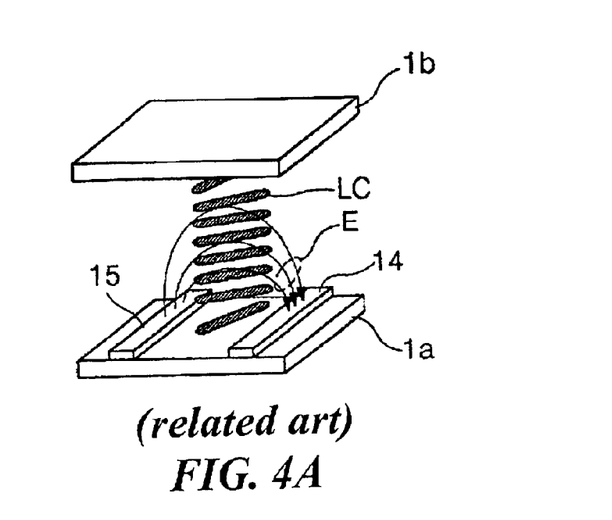
Figure 4B:
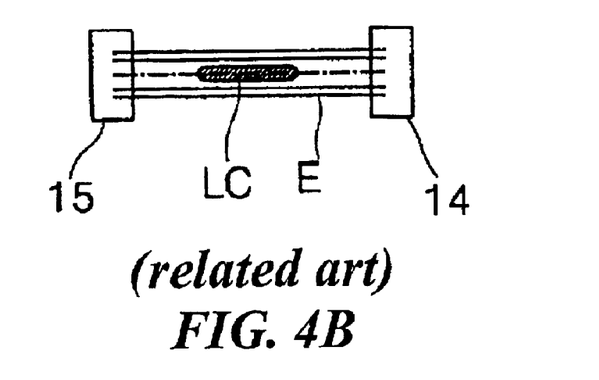

FIGS. 4A and 4B conceptually illustrate "on state" operation modes for the typical IPS LCD device. In an on state, an in-plane electric field "E", which is parallel with the surface of the first substrate 1a, is generated between the pixel and common electrodes 15 and 14. The reason is that the pixel electrode 15 and common electrode 14 are formed together on the first substrate 1a. Then, the LC molecules "LC" are twisted such that the long axes thereof coincide with the electric field direction. Thereby, the LC molecules "LC" are aligned such that the long axes thereof are perpendicular to the pixel and common electrodes 15 and 14.

By the above-mentioned operation modes and with additional parts such as polarizers and alignment layers, the IPS LCD device displays images. The IPS LCD device has wide viewing angle and low color dispersion. Specifically, the viewing angle of the IPS LCD device is about 70 degrees in direction of up, down, right, and left. In addition, the fabricating processes of this IPS LCD device are simpler than other various LCD devices. However, because the pixel and common electrodes are disposed on the same plane of the lower substrate, the transmittance and aperture ratio are low. In addition, the IPS LCD device has disadvantages of a relatively slow response time and a relatively small alignment margin. Because of the small alignment margin, the IPS LCD device needs a uniform cell gap.

The IPS LCD device has the above-mentioned advantages and disadvantages. Users may or may not select an IPS LCD device depending on the intended use.

Figure 5:
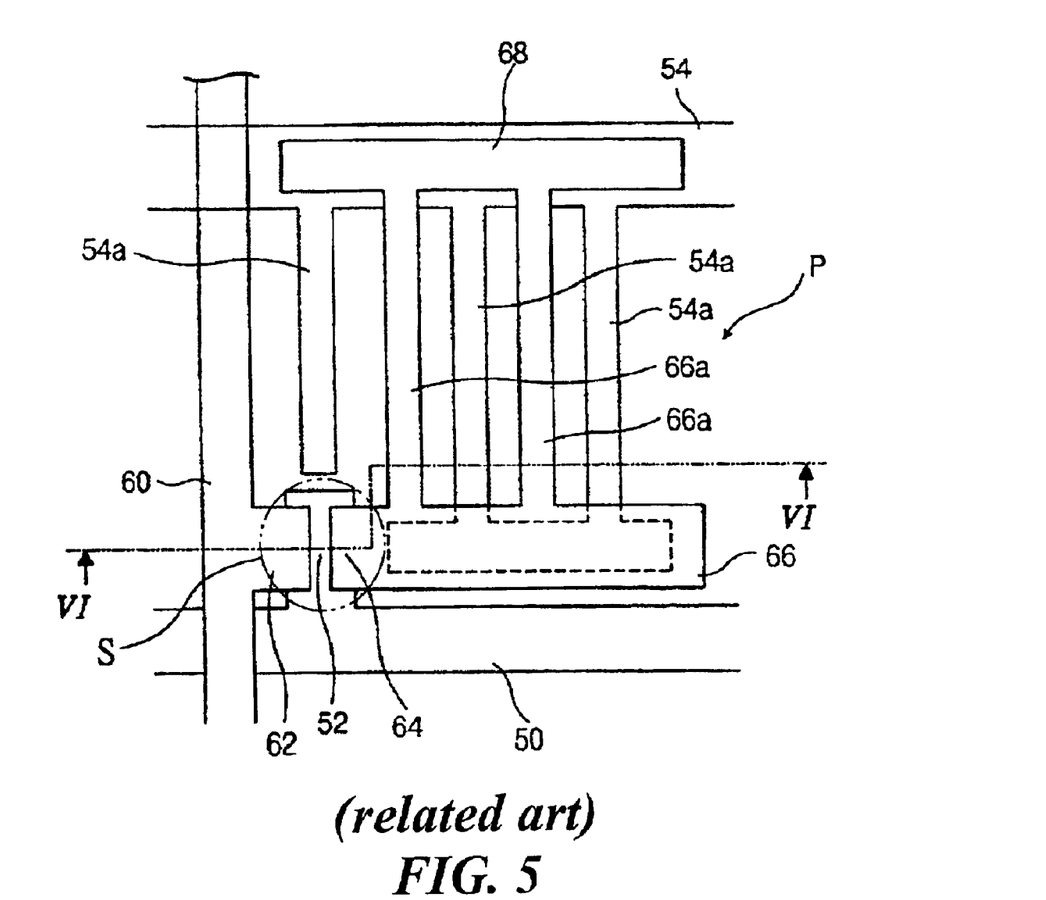
FIG. 5 is a plan view illustrating a unit pixel region of a conventional IPS LCD device.

Now, with reference to FIGS. 5, and 6A to 6D, a fabricating process for a conventional IPS LCD device is provided. FIG. 5 is a plan view illustrating a unit pixel region "P" of a conventional IPS LCD device. As shown, a gate line 50 and a common line 54 are arranged parallel to each other, and a data line 60 is arranged perpendicular to the gate and common lines 50 and 54. Near a cross point of the gate and data lines 50 and 60, a gate electrode 52 and a source electrode 62 are disposed. The gate and source electrodes 52 and 62 integrally communicate with the gate line 50 and the data line 60, respectively. The source electrode 62 overlaps a portion of the gate electrode 52. In addition, a drain electrode 64 is disposed opposite to the source electrode 62 with an interval therebetween.

A plurality of common electrodes 54a are disposed perpendicular to the common line 54 and connected thereto. The plurality of common electrode 54a are spaced apart from each other with an equal interval therebetween. A first connecting line 66 integrally communicates with the drain electrode 64, and a plurality of pixel electrodes 66a are disposed perpendicular to the first connecting line 66. First ends of the pixel electrodes 66a are connected with the first connecting line 66, and the second ends of the pixel electrodes 66a are connected with a second connecting line 68 that is disposed over the common line 54. The plurality of common electrodes 54a and pixel electrodes 66a are spaced apart from each other and arranged in an alternating pattern. Therefore, each common electrode 54a is parallel to an adjacent pixel electrode 66a.

FIGS. 6A to 6D illustrate a sequence of fabricating processes for an array substrate 1 of the above-mentioned IPS LCD device.

Figure 6A:
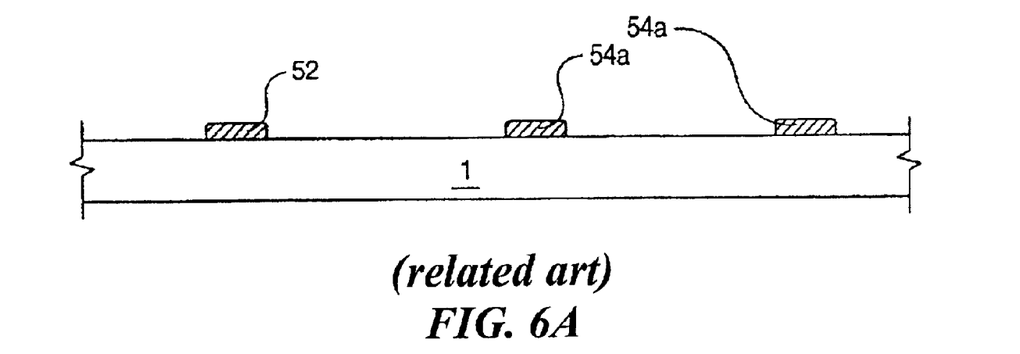
FIGS. 6A to 6D are sequential cross-sectional views taken along a line "VI—VI" of FIG. 5.

As shown in FIG. 6A, on the array substrate 1, a first metal layer is deposited and patterned to form the gate electrode 52 and the plurality of common electrodes 54a. The first metal layer is selected from a group consisting of chromium (Cr), aluminum (Al), aluminum alloy (Al alloy), molybdenum (Mo), tantalum (Ta), tungsten (W), antimony (Sb), and alloys thereof.

Figure 6B:
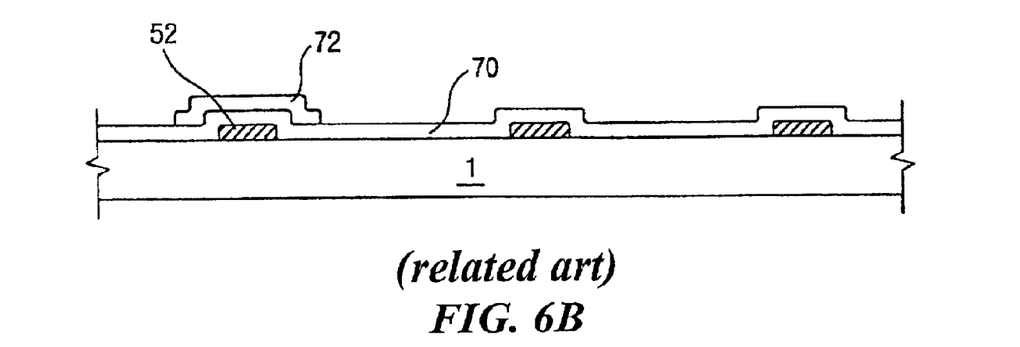

As shown in FIG. 6B, a gate-insulating layer 70 is formed on the array substrate 1 to cover the gate and common electrodes 52 and 54a, and on the gate-insulating layer 70, an active layer 72 is formed over gate electrode 52. The gate-insulating layer 70 is silicon nitride (SiNx) or silicon oxide (SiO$_2$), while the active layer 72 includes an amorphous silicon layer (not shown) and a doped amorphous silicon layer (not shown).

Figure 6C:
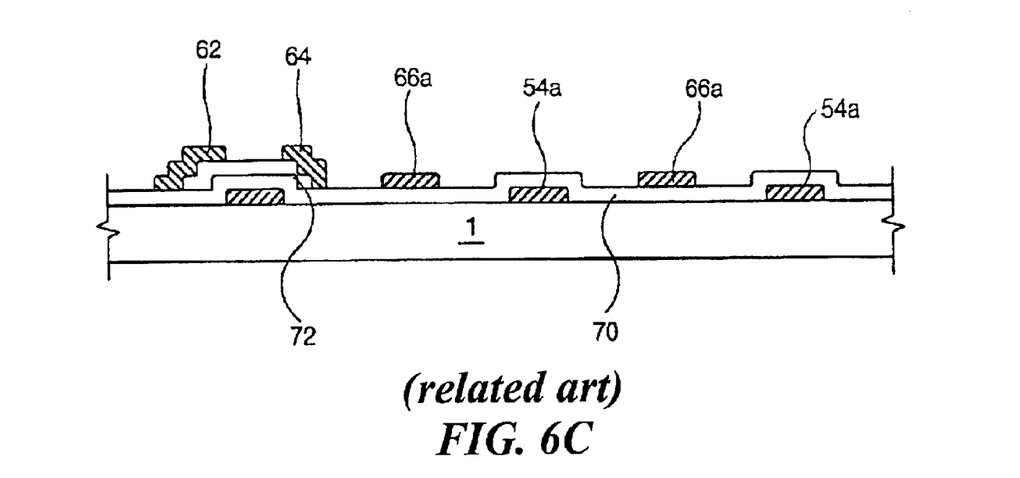

As shown in FIG. 6C, a second metal layer is deposited and patterned to form the source and drain electrodes 62 and 64 on the active layer 72 and the pixel electrodes 66a on the gate-insulating layer 70. The pixel electrodes 66a are spaced apart from the adjacent common electrode 54a by a desired distance.

Figure 6D:
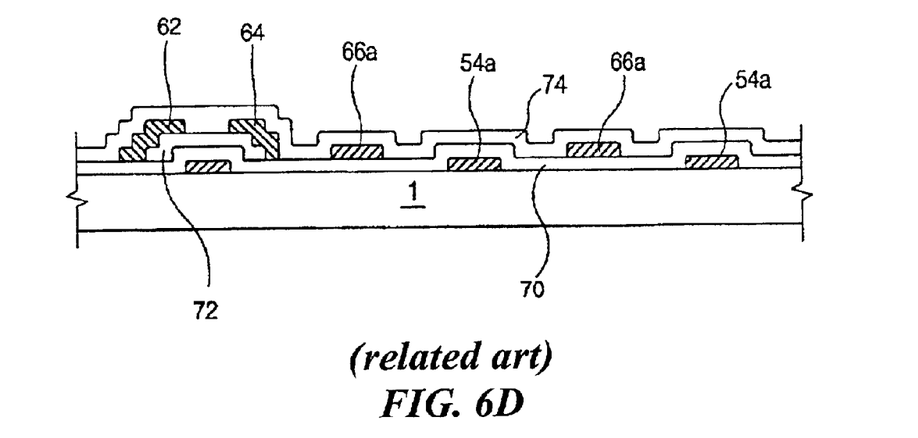

As shown in FIG. 6D, a passivation layer 74 is formed to cover the source, drain, and pixel electrodes 62, 64, and 66a. The passivation layer 74 serves to protect the source, drain, and pixel electrodes 62, 64, and 66a from exterior humidity or contaminants.

As described above, the plurality of common electrodes 54a of the IPS LCD device are connected with the common line 54. Though the IPS LCD device has an advantage of wide viewing angle because of the above-mentioned structure including the common line 54, the common line 54 of the IPS LCD device is much higher in resistance than the common electrode of the TN LCD device.

That is to say, the common electrode 14 of the TN LCD device in FIG. 1 is uniformly disposed on the overall surface of the upper substrate opposing the pixel electrode. Therefore, the common electrode 14 of the TN LCD device has the shape of a surface and has a relatively low resistance. In contrast, the common line 54 of the IPS LCD device in FIG. 4 has the shape of a line and has a relatively high resistance.

A common voltage signal is applied to the common line 54 of the IPS LCD device or the common electrode 14 of the TN LCD device. In case of the IPS LCD device, because the common line has a relatively high resistance, it is associated with a relatively high voltage drop. Because the common voltage signal is applied from both ends of the common line, the voltage drop is highest at the center of the IPS LCD panel. That is to say, the common voltage signal is decreasing as it transmits from the sides of the IPS LCD panel to the center thereof.

Even if the common voltage signal is adjusted or compensated at an exterior drive circuit, the above-mentioned voltage drop cannot be avoided. The voltage variation due to the voltage drop of the common voltage signal causes fatal defects, for example, a flicker to display quality of the conventional IPS LCD device.

Together with the above-mentioned voltage variation of the common voltage signal, a conventional structure of an inverted-staggered type TFT itself is associated with the flicker problem. The inverted-staggered type TFT is widely selected as a switching element for the LCD devices including the IPS LCD device. The inverted-staggered type TFT has a simple structure to be easily fabricated but exhibits superior electrical qualities. To achieve such superior electrical qualities, a source electrode and a drain electrode of the inverted-staggered type TFT overlap a gate electrode thereof. Specifically, the overlapping width of the drain electrode over the gate electrode is associated with the flicker problem. A detailed explanation will be provided with reference to FIGS. 7 and 8.

Figure 7:
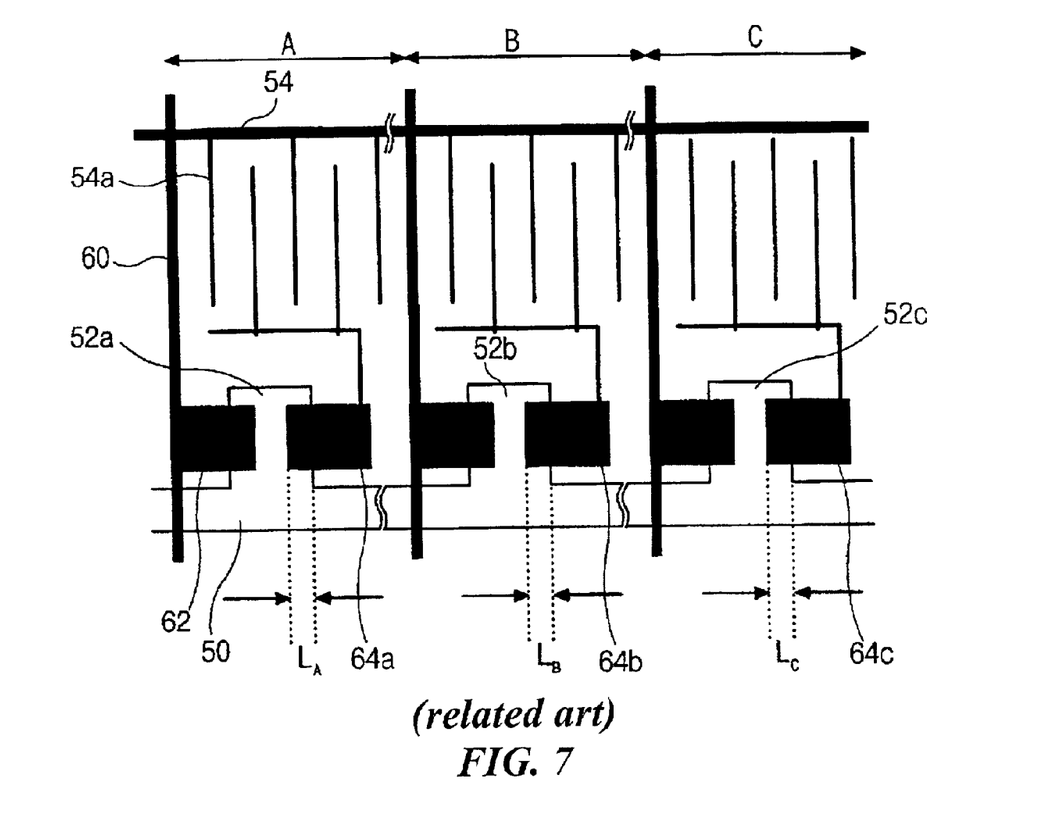
FIG. 7 is a plan view showing first to third pixel regions of the conventional IPS LCD device.

In FIG. 7, a first pixel region "A" and a third pixel region "C" are arranged at a left side and at a right side, respectively, with a second pixel region "B" disposed therebetween. In the first to third pixel regions "A" to "C", drain electrodes 64a to 64c overlap gate electrodes 52a to 52c, respectively. At this point, a first overlapping width "$L_A$", a second overlapping width "$L_B$", and a third overlapping width "$L_C$" conventionally have the same value ($L_A=L_B=L_C$). Within the first to third overlapping widths "$L_A$" to "$L_C$", a parasitic capacitance "Cgs" exists between the drain electrode 64a (64b, 64c) and the gate electrode 52a (52b, 52c).

Figure 8:
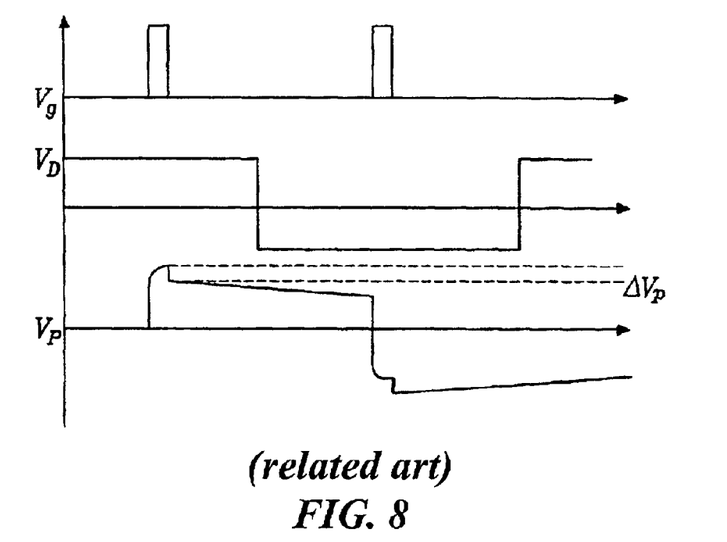
FIG. 8 is a graph showing electric signals applied to electrodes of the conventional IPS LCD device.

In FIG. 8, when a gate voltage signal "Vg" is applied to the TFT ("S" in FIG. 5), the TFT switches a drain voltage signal "Vd" such that a pixel voltage signal "Vp" is applied to the pixel electrode. At this point, a kickback voltage "ΔVp" is induced by the parasitic capacitance "Cgs", thereby decreasing the pixel voltage signal "Vp" by the kickback voltage "ΔVp".

The above-mentioned kickback voltage "ΔVp" is conventionally compensated for by adjusting the common voltage signal. However, in case of the IPS LCD device, because the common line has a high resistance, the common voltage signal varies along the common line. Accordingly, the kickback voltage "ΔVp" cannot be compensated for sufficiently, and, thus, the flicker problem occurs in the IPS LCD device.

SUMMARY OF THE INVENTION

Accordingly, the present invention is directed to an IPS LCD device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, the present invention provides a liquid crystal display device. The liquid crystal display device includes: a substrate; a plurality of thin film transistors each including a gate electrode, a source electrode, and a drain electrode; a gate line and a data line electrically connecting with the gate electrode and the source electrode; and a pixel electrode electrically connecting with the drain electrode, wherein overlapping widths between the gate electrode and the source and drain electrodes vary in accordance with the position of the thin film transistor.

A distance between the source electrode and the drain electrode is constant.

In another aspect, the present invention provides an array substrate for a liquid crystal display device, the array substrate including: a substrate including a first pixel region, a second pixel region, and a third pixel region, the first pixel region and the third pixel region being disposed at both sides of the substrate with the second pixel region disposed therebetween; a plurality of gate lines and data lines on the substrate; a plurality of thin film transistors each formed on the first to third pixel regions, the thin film transistor including a gate electrode, a source electrode, and a drain electrode; and a pixel electrode on the substrate, wherein overlapping widths between the drain electrode and the gate electrode vary among the first to third pixel regions.

The overlapping width of the drain electrode is the highest in the first pixel region, and is the larger in the third pixel region than in the second pixel region.

The array substrate further includes a common electrode formed on the substrate and being parallel to the pixel electrode.

A distance between the source electrode and the drain electrode is constant in the first to third pixel regions.

In another aspect, the present invention provides a liquid crystal display device, which includes: first and second substrates; a gate line and a data line on the first substrate, the gate and data lines being formed on a plurality of pixel regions; a common line on the first substrate; a plurality of common and pixel electrodes on the first substrate; a thin film transistor having a gate electrode, a source electrode, and a drain electrode at a crossing point of the gate and data lines, wherein a capacitance between the gate electrode and the drain electrode varying in accordance with a position of the corresponding pixel region; and a liquid crystal layer between the first and second substrates.

The capacitance is larger in a center pixel region centered among the plurality of pixel regions than in the other pixel regions.

The pixel electrode is selected from a group consisting of indium tin oxide (ITO) and indium zinc oxide (IZO). The common electrode is selected from a group consisting of chromium (Cr), aluminum (Al), aluminum alloy (Al alloy), molybdenum (Mo), tantalum (Ta), tungsten (W), antimony (Sb), and alloys thereof.

The common and pixel electrodes are different layers.

The common electrode is electrically connected with the common line

The device further includes a first connecting line being electrically connected with the drain electrode, and the first connecting line is electrically connected with the pixel electrode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In an IPS LCD device according to the preferred embodiment, an overlapping width of a drain electrode varies in accordance with a position of a corresponding pixel region. Thereby, variation of a kickback voltage "$\Delta Vp$ "(delta_Vp)" with respect to the position of the pixel region is minimized and a flicker problem of the IPS LCD device is avoided.

Figure 9:
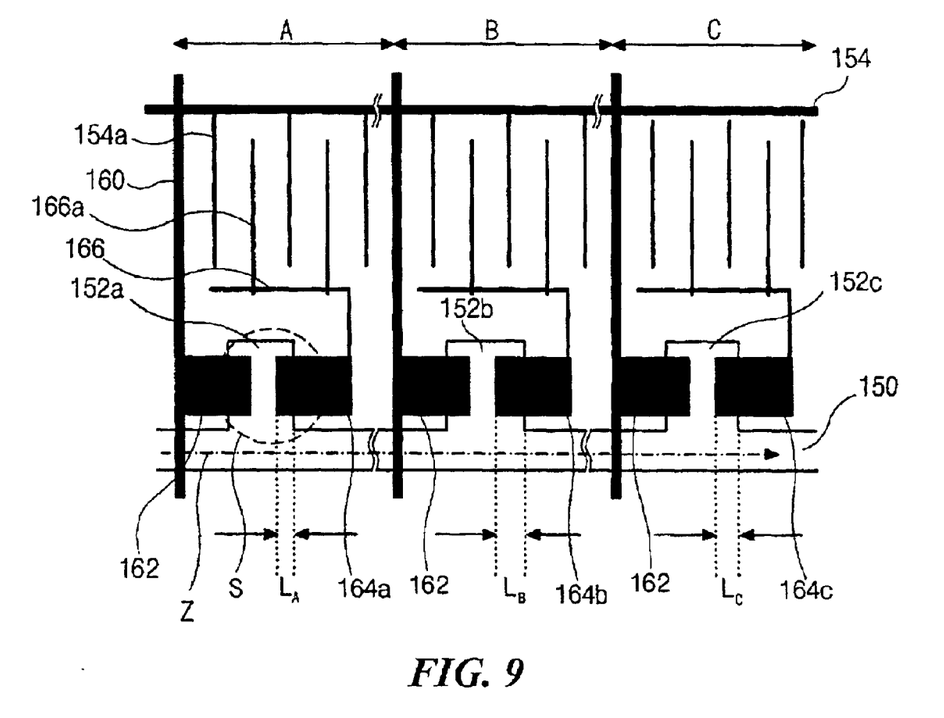
FIG. 9 is a plan view illustrating first to third pixel regions of an IPS LCD device according to a preferred embodiment of the present invention.

In FIG. 9, a first pixel region "A" and a third pixel region "C" are arranged at a left side and at a right side, respectively, with a second pixel region "B" disposed therebetween. In the pixel region "A" ("B", "C"), a gate line 150 and a common line 154 are arranged parallel to each other, and a data line 160 is arranged perpendicular to the gate and common lines 150 and 154. Near a cross point of the gate and data lines 150 and 160, a gate electrode 152a (152b, 152c) and a source electrode 162 are disposed. The gate and source electrodes 152a (152b, 152c) and 162 integrally communicate with the gate line 150 and the data line 160, respectively. The source electrode 162 overlaps a portion of the gate electrode 152a (152b, 152c). In addition, a drain electrode 164a (164b, 164c) is disposed opposite to the source electrode 162 with an interval therebetween.

A plurality of common electrodes 154a are disposed perpendicular to the common line 154 and connected thereto. The plurality of common electrodes 154a are spaced apart from each other with an equal interval therebetween.

A first connecting line 166 integrally communicates with the drain electrode 164a (164b, 164c), and a plurality of pixel electrodes 166a are disposed perpendicular to the first connecting line 166 and connected thereto. The plurality of common electrodes 154a and the pixel electrodes 166a are spaced apart from each other and arranged in an alternating pattern. Therefore, each common electrode 154a is parallel to an adjacent pixel electrode 166a with a predetermined interval therebetween.

The first pixel region "A" is adjacent a gate pad (not shown) applying a gate voltage signal. The gate voltage signal is transmitted through the gate line 150 in a direction "Z", which is from the first pixel region "A" to the third pixel region "C". When the gate voltage signal is transmitted from the first pixel region "A" to the third pixel region "C", a voltage drop occurs along the gate line 150. Because of the direction "Z" of the gate voltage signal, the voltage drop is the highest at the third pixel region "C", the farthest pixel region away from the gate pad (not shown).

In another aspect, a common voltage signal is applied to both ends of the common line 154 from both sides of the IPS LCD device. Therefore, the voltage drop of the common voltage signal is the highest in the second pixel region "B". The first and third pixel regions "A" and "C" are associated with almost the same voltage drop lower than that of the second pixel region "B". When the above-mentioned variation of the common voltage signal is involved with a kickback voltage "ΔVp", the flicker problem of the LCD device occurs.

The kickback voltage "ΔVp" is induced in a pixel voltage signal "Vp" when a drain voltage signal is transmitted to the pixel electrode 166a. The kickback voltage "ΔVp" is determined by a parasitic capacitance "Cgs", a liquid crystal capacitance "$C_{LC}$", a storage capacitance "$C_{ST}$", and a gate voltage signal "Vg" (see a following equation 1).

$$\Delta Vp = \frac{C_{gs} \Delta Vg}{C_{gs} + C_{LC} + C_{ST}} \qquad \text{equation 1}$$

Referring now to the equation 1, variation of the kickback voltage "ΔVp" and a design for compensating the variation thereof is explained with respect to the first to third pixel regions "A" to "C". At this point, the liquid crystal capacitance "$C_{LC}$" and the storage capacitance "$C_{ST}$" are assumed constant throughout the overall pixel regions.

In the first pixel region "A" where the voltage drop of the gate voltage signal "Vg" is the lowest, because the gate voltage signal "Vg" is the highest, the kickback voltage "ΔVp" is relatively high. In the third pixel region "C" where the voltage drop of the gate voltage signal "Vg" is the highest, however, because the gate voltage signal "Vg" is the lowest, the kickback voltage "ΔVp" is relatively low. In addition, the kickback voltage "ΔVp" exhibit an intermediate value in the second pixel region "B" disposed between the first and third regions "A" and "C".

To compensate for the variation of the kickback voltage "ΔVp" between the first and third pixel regions "A" and "C", the parasitic capacitance "Cgs" of the first pixel region "A" is designed to have a relatively low value. In addition, the parasitic capacitance "Cgs" of the third pixel region "C" is designed to have a relatively high value. For the second pixel region "B", however, the parasitic capacitance "Cgs" is designed to have the highest value, even though the kickback voltage "ΔVp" of the second pixel region "B" has the intermediate value between those of the first and third pixel regions "A" and "C". Because the voltage drop of the common voltage signal is the highest in the second pixel region "B", more compensation is needed for the parasitic capacitance "Cgs" of the second pixel region "B". That is to say, in case of the second pixel region "B", the voltage drop of the common voltage signal as well as the gate voltage signal affects the kickback voltage "ΔVp". Therefore, the parasitic capacitance "Cgs" must have the highest value for the second pixel region "B".

To achieve the optimum parasitic capacitance "Cgs", first to third overlapping widths "$L_A$", "$L_B$", and "$L_C$" of the drain electrode 164a, 164b, and 164c are respectively adjusted in accordance with the first to third pixel regions "A" to "C". In case of considering the voltage drop of the gate voltage signal "Vg" only, the third overlapping width "$L_C$" is designed to be the largest. The second overlapping width "$L_B$" is designed to be larger than the first overlapping width "$L_A$".

Further, in case of considering the voltage drop of the common voltage signal "Vc" as well as the gate voltage signal "Vg", the second overlapping width "$L_B$" is designed to be the largest. At this point, the third overlapping width "$L_C$" is designed to be larger than the first overlapping width "$L_A$".

For the above-explained configuration, a distance between the source electrode 162 and the drain electrode 164a (164b, 164c) is constant regardless of the different overlapping width of the drain electrodes 164a, 164b, and 164c. That is to say, the source electrodes 162 also exhibit various overlapping widths over the gate electrode 152a (152b, 152c). However, the overlapping width of the source electrode 162 little affects the operation quality of the IPS LCD device according to the preferred embodiment.

As explained above, for the preferred embodiment of the present invention, the overlapping width of the drain electrode is variously adjusted in accordance with the relative position of the corresponding pixel region. That is to say, the parasitic capacitance "Cgs", which is an overlapping capacitance induced between the drain electrode and the gate electrode, is adjusted in accordance with the position of the corresponding pixel region, thereby compensating for the kickback voltage "ΔVp" throughout the overall pixel regions of the IPS LCD device. Accordingly, the flicker problem of the conventional IPS LCD device is avoided, and an improved display quality can be achieved.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

a substrate;

a plurality of thin film transistors, each including a gate electrode, a source electrode, and a drain electrode;

a gate line electrically connected with the gate electrode;

a data line electrically connected with the source electrode;

a common line on the substrate and parallel with the gate line;

a plurality of pixel electrodes electrically connecting with the drain electrode; and a plurality of common electrodes integrally connected to the common line, wherein the plurality of common electrodes and plurality of pixel electrodes are spaced apart from each other and arranged in an alternating pattern.

2. The device of claim 1, wherein a distance between the source electrode and the drain electrode is constant.

3. The device of claim 1, wherein the width of the overlapping portion of the gate electrode and the drain electrode varies in accordance with the position of the respective one of the thin film transistors along the gate line.

* * * * *